Jan. 4, 1944.  A. CALLSEN  2,338,403

STARTING DEVICE FOR INTERNAL COMBUSTION ENGINES

Filed March 12, 1941

Inventor
Albert Callsen
By Roy F. Steward
his Attorney

Patented Jan. 4, 1944

2,338,403

UNITED STATES PATENT OFFICE 2,338,403

STARTING DEVICE FOR INTERNAL COMBUSTION ENGINES

Albert Callsen, Stuttgart, Germany; vested in the Alien Property Custodian

Application March 12, 1941, Serial No. 383,029
In Germany April 24, 1940

1 Claim. (Cl. 123—179)

The invention relates to starting devices for internal combustion engines of aircraft or vehicles, comprising a motor, a flywheel driven by said motor, a reducing gear and a friction clutch adapted to transmit the rotation of the flywheel to a driving member such as a jaw clutch member which is adapted to engage with a part of the engine to be started.

One object of the present invention is to provide a starter device of the above type embodying novel means for moving a rotatable driving member of the starter into driving engagement with a rotatable member of the engine to be started wherein the driving member is automatically shifted by rotation of the starter, the shifting action being controlled by a stop member which can be actuated at will by the operator.

Other objects and advantages of the invention will be obvious from the following description.

Figure 1:
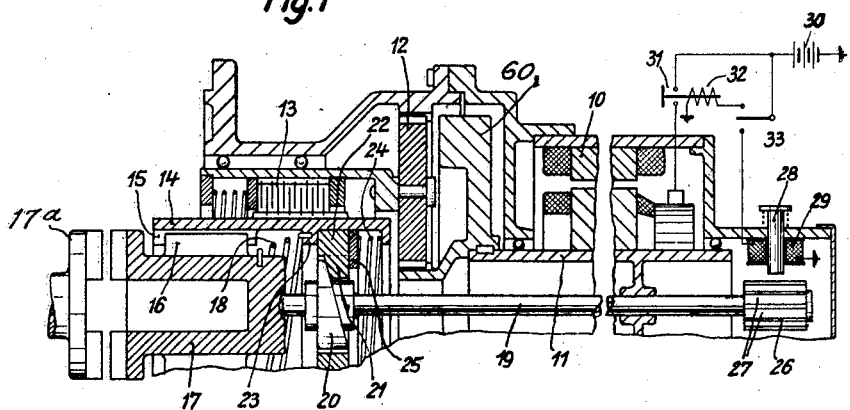
Figure 2:
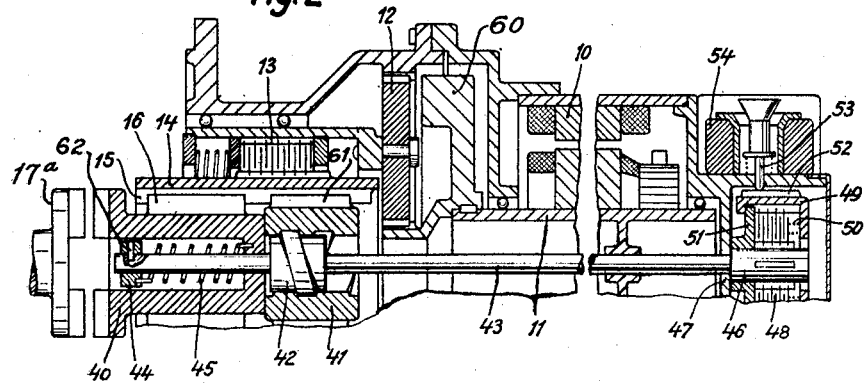

Two embodiments of the invention are illustrated in section by way of example in the accompanying drawing, in which Fig. 1 shows the first embodiment of the invention, and Fig. 2 a modification of Fig. 1.

As shown in Fig. 1 an electromotor 10 is provided as the driving or actuating means for the starting device, a flywheel 60 being keyed on the hollow armature shaft 11 of this electromotor. The flywheel is connected by a planet gear 12 with a friction disc clutch 13, which transmits the turning force of the centrifugal mass 60 to a sleeve 14. This sleeve 14 has on its inner side ledges or splines 15 between which ledges or splines 16 of a clutch element 17 engage which is shiftable in longitudinal direction in the sleeve. The inner distance between the ledges or teeth 15 of the sleeve, on the one hand, is so great and the width of the ledges or teeth 16, on the other hand, is so small that the clutch element 17 can rotate by a predetermined amount relative to the sleeve. A torsion spring 18 is inserted between the sleeve 14 and the clutch element 17 and is arranged to turn forward the clutch element relative to the sleeve in the direction of rotation of the starting device.

A shifting arrangement with a cam drive, which will now be described, serves for engaging the clutch element 17 with a rotatable part or clutch member 17a of the engine to be started. On a rod 19 located in the hollow armature shaft 11 a cam disc 20 is fixed on that end of the rod which projects into the sleeve 14. On said cam disc 20 slides a tooth 21 of a disc 22 which is mounted so that it can rotate relative to the sleeve 14 between a collar 23 of the sleeve and a friction disc 25 subjected to the pressure of a weak spring 24. A head 26 having grooves 27 is mounted on the other end of the rod. A pin 28 mounted on the circumference of the head is adapted to be brought into engagement with the grooves of head 26 by means of an electromagnet 29, so that in this position this pin prevents the rod from rotating.

For energizing the electromotor and the electromagnet a battery 30 is provided, which is connected with the electromotor by an electromagnetically actuated switch 31, the exciter coil 32 of which is adapted to be switched in and cut out by means of a change-over switch 33, by which also the electromagnet 29 is controlled. The switch is constructed so that it actuates alternately in the one position the switch of the electromotor and in the other position the electromagnet.

The starting device operates as follows:

For starting the internal combustion engine the electromotor 10 is first switched in and brings the flywheel to a high number of revolutions. The friction clutch 13, the sleeve 14 with the clutch element 17, the disc 22 and the cam disc 20 with rod 19 revolve at first idly with the flywheel. When the flywheel has attained the required number of revolutions, the switch 33 is actuated and the coil 29 switched in. As a result thereof, the pin 28 engages in the grooves 27 of head 26 and thus secures the rod 19 against further rotation. The result thereof is, that the tooth 21 of the disc 22 slides on the cam disc 20 and shifts the rod 19 towards the clutch element and engages this clutch element. When the front ends of the claws of the clutch elements encounter the one the other, the shifting forward of rod 19 is prematurely stopped. The shifting force exerted in axial direction by the rod 19 remains, however, low for the reason that disc 22 can slide between stop 23 and disc 25. The clutch element 17 can therefore easily be turned by the sleeve 14 moving behind the same, in order that this clutch element can engage into the next following gap.

The embodiment shown in Fig. 2 differs from the first embodiment only as regards the shifting arrangement for the claw, the other elements, as far as they are shown, are therefore designated by the same reference numerals as in Fig. 1. The clutch claw 40 is pushed forward by a nut 41 which is arranged in sleeve 14 by means of ledgers or teeth 61 so that it can shift in the longitudinal direction and can be drawn along by the ledges or teeth 15 of the sleeve. The nut can screw on a screw-threaded piece 42 of a rod 43 provided in the starting device. The rod projects, on one side of the screw-threaded piece, into the clutch claw and carries on its end a ring 44 fixed on it by a pin 62. In this ring 44 one end of a helical spring 45 is fixed, the other end of said spring being fixed in a part of the clutch claw 40. This spring corresponds in function to the torsion spring 18 of Fig. 1. On the other side of the screw-threaded piece a rod 43 extends beyond the electromotor and carries a grooved head 46 which bears against the bearing shield 47 of the electromotor and prevents the rod from shifting relative to the claw. A friction disc clutch 48 is mounted on the grooved head. Some of the friction discs are connected with the grooved head and the other friction discs with a sleeve 49. The friction discs are under the pressure of a spring 50 which presses the discs against a supporting plate 51. The sleeve 49 has grooves 52 in its outer side into which grooves a pin 53 can engage which is moved by an electromagnet 54. The switching of the electromagnet is similar as in the first embodiment of the invention.

During the initial rotation of the centrifugal mass and before the desired speed has been reached, the pin 53 is not in engagement with sleeve 49. The rod 43 can therefore turn with the nut 41 or with the sleeve. When the desired speed has been reached and the driver switches in the electromagnet 54, the pin 53 comes into engagement with the grooves of sleeve 49 and stops the rod 43 by means of the friction clutch 48. Consequently the nut 41 screws forward on the screwthreaded piece 42 and pushes the claw in front of it. When the forward shifting is terminated the weak friction clutch 48 slides through.

I claim:

In a starter for internal combustion engines comprising an electric motor, a flywheel driven by the same, a hollow shaft on which the motor armature and the flywheel are fixed, a sleeve, an engine-engaging clutch member mounted within the sleeve rotatable therewith and axially movable relative thereto, a coacting clutch member on the engine shaft, means including a friction clutch intermediate the flywheel and the sleeve for rotating the sleeve from the flywheel and resilient means for retracting the engine-engaging clutch member from the coacting clutch member, a mechanism for starting the electric motor and thereafter moving the engine-engaging clutch member into engagement with its coacting clutch member, said mechanism consisting of a rod extending through the hollow motor shaft, a cam on said rod having a lateral cam-face within the sleeve, a ring within the sleeve and provided with a tooth arranged to run in contact with the cam face, a resilient friction means arranged to transmit rotation of the sleeve to the said ring, the rod having one end arranged to transmit longitudinal movement to the engine-engaging clutch member in a direction to engage said clutch member with its cooperating member, said rod having its other end provided with a fixed head grooved longitudinally on its outside, a longitudinally movable pin arranged to engage a groove in the fixed head, to hold the rod against rotation, electromagnetic means for moving the pin into engagement with the head, resilient means for disengaging the pin from the head, a battery, an electromagnetic motor switch and connections for connecting the battery to the motor armature, circuit connections from the battery for energizing the electromagnetic motor switch and the electromagnetic means for operating the pin, and a manually operated switch arranged to first switch in the electromagnetic motor switch, then switch it out and switch in the electromagnetic means for actuating the pin, and then disconnect the battery from both electromagnetic devices, whereby the motor is started to rotate the flywheel, the sleeve, the engine-engaging clutch member, and the rod, then the motor current is cut off and thereafter the rotation of the rod is stopped and it is moved longitudinally by its cam and the coacting tooth on the ring, to close the clutch connection to the engine, and then the parts return to the normal condition with the clutch out of engagement.

ALBERT CALLSEN.